US012736756B2

(12) United States Patent
Hou et al.

(10) Patent No.: US 12,736,756 B2
(45) Date of Patent: Sep. 15, 2026

(54) DUST-PROOF AND SHADING ADAPTER

(71) Applicant: T&S COMMUNICATIONS CO., LTD., Shenzhen (CN)

(72) Inventors: Dan Hou, Shenzhen (CN); Xin Zou, Shenzhen (CN)

(73) Assignee: T&S COMMUNICATIONS CO., LTD., Shenzhen (CN)

( * ) Notice: Subject to any disclaimer, the term of this patent is extended or adjusted under 35 U.S.C. 154(b) by 308 days.

(21) Appl. No.: 18/613,130

(22) Filed: Mar. 22, 2024

(65) Prior Publication Data

US 2025/0093590 A1 Mar. 20, 2025

Related U.S. Application Data

(63) Continuation of application No. PCT/CN2023/118971, filed on Sep. 15, 2023.

(51) Int. Cl.
*G02B 6/38* (2006.01)

(52) U.S. Cl.
CPC ......... *G02B 6/3849* (2013.01); *G02B 6/3825* (2013.01)

(58) Field of Classification Search
CPC ............................ G02B 6/3825; G02B 6/3849
See application file for complete search history.

(56) References Cited

U.S. PATENT DOCUMENTS 5,348,487 A * 9/1994 Marazzi ................. G02B 6/381 439/138
5,802,229 A * 9/1998 Evans .................. G02B 6/3869 385/88
5,883,995 A * 3/1999 Lu ........................ G02B 6/3825 385/75
6,247,849 B1 * 6/2001 Liu ...................... G02B 6/3849 385/94
6,688,780 B2 * 2/2004 Duran .................. G02B 6/3825 385/76
7,785,018 B2 * 8/2010 Jones ................... G02B 6/3849 385/94
11,029,470 B2 * 6/2021 Wong ..................... G02B 6/406
2013/0121643 A1 5/2013 Sanders
2015/0078710 A1 3/2015 Sato

FOREIGN PATENT DOCUMENTS

| | | |
|---|---|---|
| CN | 204758872 | 11/2015 |
| CN | 108957643 | 12/2018 |
| CN | 211263857 | 8/2020 |
| CN | 215728962 | 2/2022 |
| CN | 218446080 | 2/2023 |

* cited by examiner

*Primary Examiner* — Charlie Y Peng
(74) *Attorney, Agent, or Firm* — Winston Hsu

(57) ABSTRACT

A dust-proof and shading adapter comprises a frame and shading components, an interior of a front end of the frame is formed with horizontally arranged chambers having upward openings, an front end of each chamber is provided with a port, each chamber is equipped with one of the shading components that comprises a hook piece and a baffle, wherein, the side walls of the chamber are provided with guide rails that restrict the vertical sliding movement of the baffle, wherein, the guide rails are arcuate and are curved outward towards the opening of the chamber, the bottom of the guide rails align with the bottom of the port, and the upper end of the hook piece is hinged to the middle of the upper surface of the chamber, while the lower end of the hook piece is interlocked with the baffle through hinged engagement.

9 Claims, 5 Drawing Sheets

DUST-PROOF AND SHADING ADAPTER

CROSS REFERENCE TO RELATED APPLICATIONS

This application is a continuation application of PCT Application No. PCT/CN2023/118971, filed on Sep. 15, 2023. The content of the application is incorporated herein by reference.

BACKGROUND OF THE INVENTION

1. Field of the Invention

The application relates to an optical fiber adapter, particularly refers to a dust-proof and shading SC type LC adapter.

2. Description of the Prior Art

The optical fiber adapter, which can be inserted into different types of optical fiber connectors at both ends, is widely used in optical fiber distribution frames, optical fiber communication equipment, instruments, and the like. One type of optical fiber adapter is the SC type LC adapter, which is made using an easy-to-operate modular jack latch mechanism.

However, the general SC type LC adapters on the market do not have a function of blocking light, and their air cavities are prone to be affected by dust and debris. Moreover, light emitted from uncovered connectors can irritate the human eye, so maintenance personnel need to use dust caps to block the light. However, dust caps can be easily lost or contaminated during frequent removal and replacement.

To solve the above problems, optical fiber adapters with a sliding dust-proof and shading component inside the housing that can block the light emitted from the port have emerged. These adapters achieve the same effect of blocking light and dust as the dust caps, but their height is not suitable for high-density optical fiber distribution systems, making them inconvenient to use.

SUMMARY OF THE INVENTION

To solve the problem of the existing dust-proof and shading (light-blocking) adapter being too tall, a dust-proof and shading adapter is provided.

The technical problems of the invention are solved by the following technical solutions:

A dust-proof and shading adapter comprises a frame and shading components, an interior of a front end of the frame is formed with horizontally arranged chambers having upward openings, an front end of each chamber is provided with a port for mating engagement with a connecting piece, each chamber is equipped with one of the shading components that comprises a hook piece and a baffle, wherein, the side walls of the chamber are provided with guide rails that restrict the vertical sliding movement of the baffle, wherein, the guide rails are arcuate and are curved outward towards the opening of the chamber, the bottom of the guide rails aligns with the bottom of the port, an upper end of the hook piece is hinged to the middle of the upper surface of the chamber, while the lower end of the hook piece is interlocked with the baffle through hinged engagement, wherein a reciprocating rotational movement of the hook piece drives the baffle to slide up and down, enabling the baffle to cover or uncover the port.

In some embodiments, the dust-proof and shading adapter further comprises a detachably mounted upper cover on the opening position of the chamber, wherein the upper cover cooperates with the frame to form a sealed cavity.

In some embodiments, wherein the shading component further comprises an elastic spring piece, wherein two ends of the elastic spring piece are supported against the upper surface of the hook piece and the lower surface of the upper cover, respectively.

In some embodiments, wherein the lower surface of the hook piece engages with the connecting piece inserted into the port to drive the hook piece to swing upward, and the lower surface of the hook piece is provided with a protruding arched portion.

In some embodiments, the upper cover is provided with an upper cover fixing element, and the upper end of the frame is preset with a fixing portion that cooperates with the upper cover fixing element to fix the upper cover.

In some embodiments, the upper end of each hook piece shares a common horizontally extending hinge axis hinged at the top position of the chamber.

In some embodiments, the baffle is made of semi-transparent material and comprises a connection identification portion and a non-connection identification portion, wherein the non-connection identification portion is used to block the laser emitted from the port, while the connection identification portion is lit by the laser when the connecting piece is connected to the port.

In some embodiments, the guide rails are vertically arcuate extending guide grooves on both side walls of the chamber, the guide grooves are aligned, and both sides of the baffle are formed with guide blocks that slide cooperatively with the guide grooves, respectively.

In some embodiments, wherein the lower end of the hook piece is formed with a drive arm, the baffle is formed with a cooperating groove, the end of the drive arm is embedded in the cooperating groove, the drive arm engages with the upper or lower surface of the cooperating groove, and a reciprocating rotational movement of the hook piece drives the baffle to slide up and down, enabling the baffle to cover or uncover the port.

The beneficial effects of the invention compared with prior arts are:

The dust-proof and shading adapter provided in this application reduces the adapter's height by utilizing arcuate guide rails that are curved outward in the direction of the opening of the chamber, with the bottom of the guide rails aligned with the bottom of the port, and the upper end of the hook hinged to the middle of the upper surface of the chamber, and this design makes the adapter more compact and precise, saves space, and complies with the industry standard YDT 1272.3-2005 for SC-type optical fiber adapters, which requires a height less than 9.3 mm.

In some embodiments, it also has the following effects:

Through the configuration of the connection identification part and the non-connection identification part of the baffle, the connection identification part blocks the laser emitted from the port. While ensuring the laser blockage of the port, the connection identification part is lit by the laser when the connecting piece is connected to the port, facilitating observation of the connection status between the connecting piece and the port. When the port is not inserted with a connecting piece or after the connecting piece is removed, the baffle always slides to a position where the port is closed under the action of a spring, which not only effectively blocks dust from entering but also has a shading effect. The structure is simple and easy to operate. In addition, the upper cover and the frame are assembled by snapping the upper cover fixing element and the fixing portion, which is simple and structurally secure. At the same time, it facilitates the replacement of some structures after the product is damaged, reducing costs.

Other beneficial effects of embodiments of the application will be further described below.

These and other objectives of the present invention will no doubt become obvious to those of ordinary skill in the art after reading the following detailed description of the preferred embodiment that is illustrated in the various figures and drawings.

Figure 1:
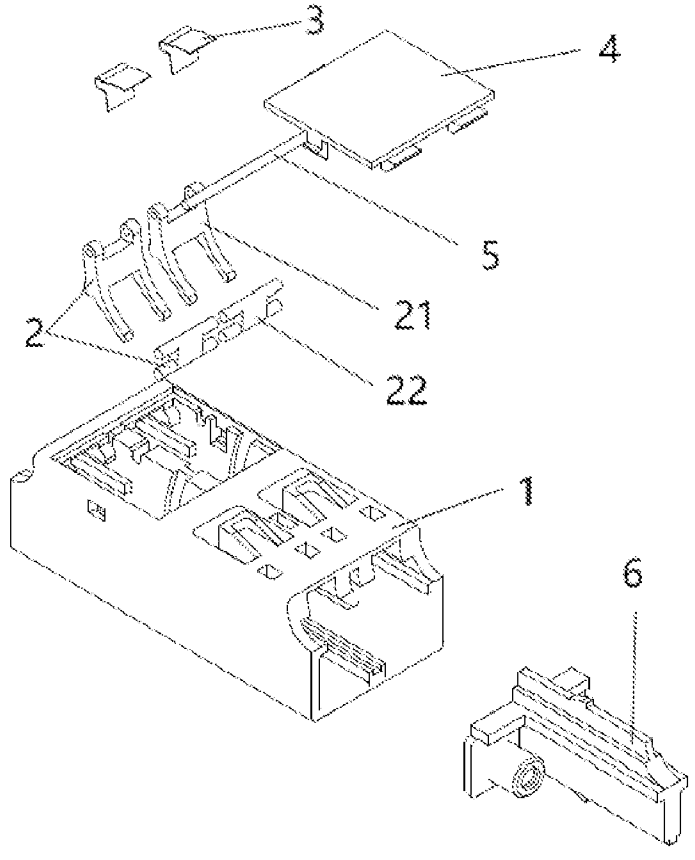
FIG. 1 is an exploded view of the dust-proof and shading adapter in the embodiment of this application.

The reference numerals are as follows:

1—a frame, 11—a guide rail, 2—a shading component, 21—a hook piece, 22—a baffle, 3—an upper cover, 4—an elastic spring piece, 5—an axis, 6—a sleeve plug, 7—a connecting piece, 71—a polished end face.

DETAILED DESCRIPTION

The following provides further explanation of this application with reference to the accompanying drawings and preferred embodiments. It should be noted that the embodiments and features within the embodiments in this application can be combined with each other without conflict.

It should be clarified that directional terms such as left, right, up, down, top, bottom, etc. used in this embodiment are relative concepts or are referenced based on the normal operating state of the product and should not be considered as restrictive.

To solve the problem of excessive height in existing dust-proof and shading adapters, this application provides a dust-proof and shading adapter with a simple structure that effectively blocks dust entry, has good shading performance, and provides an indication of optical fiber link disconnection. The dust-proof and shading adapter comprises a frame and shading components, an interior of a front end of the frame is formed with horizontally arranged chambers having upward openings, an front end of each chamber is provided with a port for mating engagement with a connecting piece, each chamber is equipped with one of the shading components that comprises a hook piece and a baffle, wherein, the side walls of the chamber are provided with guide rails that restrict the vertical sliding movement of the baffle, wherein, the guide rails are arcuate and are curved outward towards the opening of the chamber, the bottom of the guide rails aligns with the bottom of the port, the upper end of the hook piece is hinged to the middle of the upper surface of the chamber, while the lower end of the hook piece is interlocked with the baffle through hinged engagement, wherein a reciprocating rotational movement of the hook piece drives the baffle to slide up and down, enabling the baffle to cover or uncover the port.

In preferred embodiments, the dust-proof and shading adapter further comprises a detachably mounted upper cover on the opening position of the chamber, wherein the upper cover cooperates with the frame to form a sealed cavity. The shading component further comprises an elastic spring piece, wherein two ends of the elastic spring piece are supported against the upper surface of the hook piece and the lower surface of the upper cover, respectively. The lower surface of the hook piece engages with the connecting piece inserted into the port to drive the hook piece to swing upward, and the lower surface of the hook piece is provided with a protruding arched portion. The arched portion is engaged with the elastic fasteners preset on the connecting piece. Specifically, the upper surface of the hook piece is the surface facing the upper cover, and the lower surface of the hook piece is the surface facing the insertion opening of the connecting piece.

In some other embodiments, the upper cover is provided with an upper cover fixing element, and the upper end of the frame is preset with a fixing portion that cooperates with the upper cover fixing element to fix the upper cover. Specifically, the upper cover fixing element is a snap fastener for the upper cover.

Specifically, the upper ends of each hook piece share a common horizontally extending hinge axis hinged at the top position of the chamber. The baffle is made of semi-transparent material and comprises a connection identification portion and a non-connection identification portion, wherein the non-connection identification portion is used to block the laser emitted from the port, while the connection identification portion is lit by the laser when the connecting piece is connected to the port. The guide rails are vertically arcuate extending guide grooves on both side walls of the chamber, the guide grooves are aligned, and both sides of the baffle are formed with guide blocks that slide cooperatively with the guide grooves, respectively. The lower end of the hook piece is formed with a drive arm, the baffle is formed with a cooperating groove, the end of the drive arm is embedded in the cooperating groove, the drive arm engages with the upper or lower surface of the cooperating groove, and a reciprocating rotational movement of the hook piece drives the baffle to slide up and down, enabling the baffle to cover or uncover the port. The dust-proof and shading adapter of this embodiment is specifically the SC type LC adapter.

Embodiment

Figure 2:
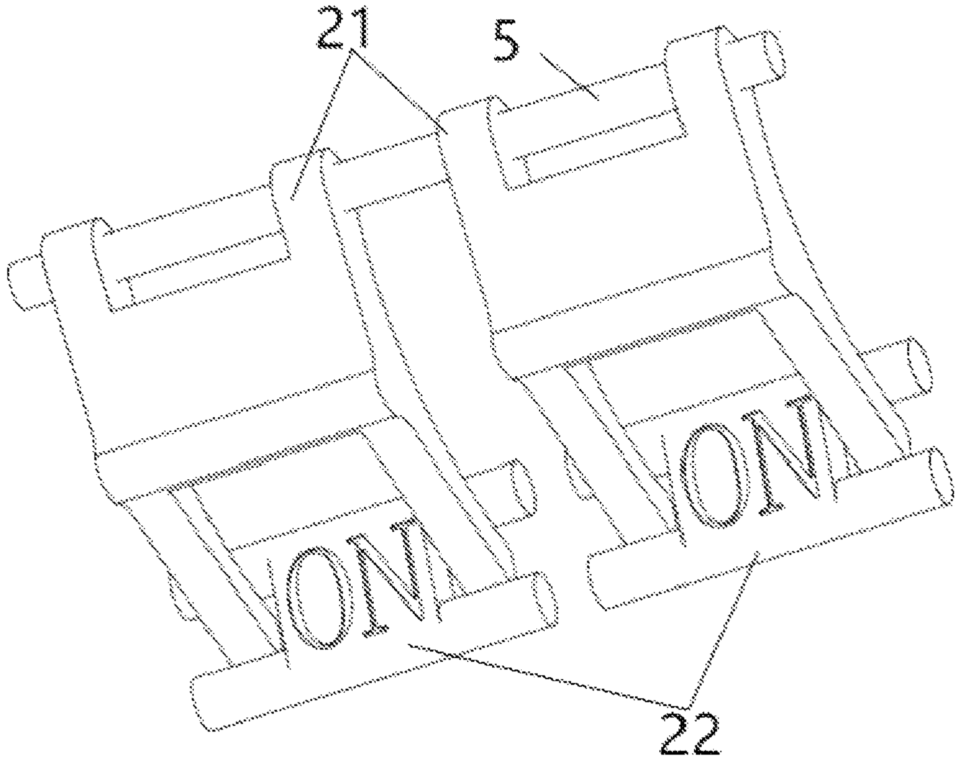
FIG. 2 is an isometric view showing the connection of two shading components through an axis in the embodiment of this application.
Figure 5:
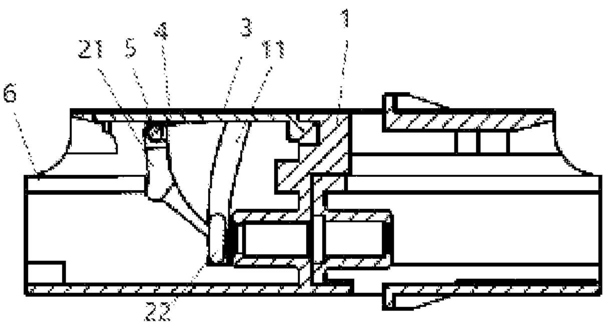
FIG. 5 is a cross-sectional view of the dust-proof and shading adapter in the embodiment of this application.

This embodiment discloses an SC-type LC adapter as shown in FIG. 1, which includes: a frame 1, an upper cover 3, a sleeve plug 6, a shading component 2, an axis 5, and an elastic spring piece 4. Among them, the shading component 2 is shown in FIG. 2, which includes a hook piece 21 and a semi-transparent baffle 22. The specific number of shading components 2 corresponds to the number of chambers in the frame 1. The front end of the frame is internally formed with a plurality of horizontally arranged chambers having upward openings. The front end of the chamber is provided with a port for mating with a preset connecting piece, and each chamber is provided with a shading component. As shown in FIG. 5, the baffle 22 is arcuately slidably connected inside the chamber of the frame 1, specifically, the baffle 22 slides along guide rails 11 on the side wall of the chamber that restricts the vertical sliding of the baffle 22. The guide rails 11 are arcuate guide rails that are curved outward towards the opening of the chamber. The upper end of the hook piece 21 is hinged to the chamber through the axis 5, and the lower end of the hook piece 21 is interlocked with the baffle 22 through hinged engagement; with the reciprocating rotational movement of the hook piece 21, the baffle 22 is driven to slide up and down along the guide rails 11, thereby allowing the baffle 22 to cover or uncover the port. This solves the risk of the adapter being contaminated by external dust, foreign objects, or other harsh environments that may damage the polished end face 71 of the connecting piece 7, while also protecting users from eye damage caused by laser light.

Figure 3:
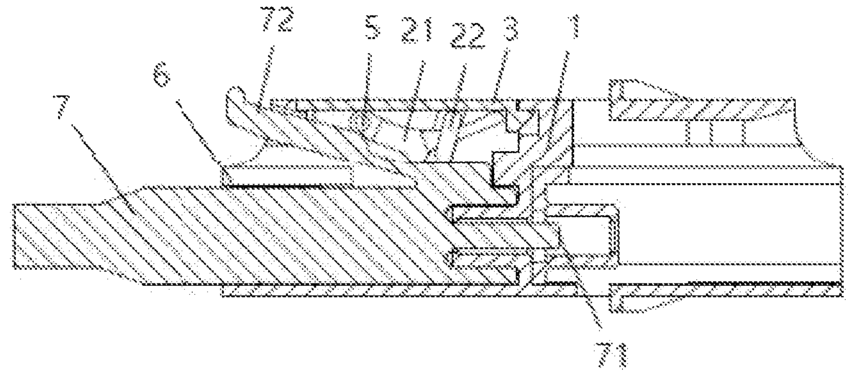
FIG. 3 is a cross-sectional view of the dust-proof and shading adapter connected to a connector in the embodiment of this application.
Figure 4:
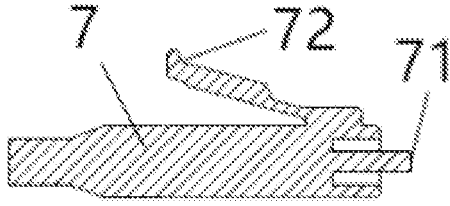
FIG. 4 is a cross-sectional view of the connector in the embodiment of this application.
Figure 6:
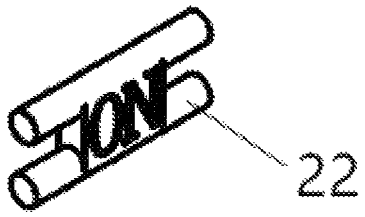
FIG. 6 is an isometric view of the baffle in the embodiment of this application.

The existing dust-proof and shading adapter has a shading component with a baffle that is a thin sheet the same size as the output port. This existing dust-proof and shading adapter without a dust cap does not have the function of indicating whether the optical fiber link is connected. The baffle 22 in this embodiment, as shown in FIG. 6, is equipped with a connection identification portion and a non-connection identification portion. As shown in FIG. 3, the non-connection identification portion is used to block the laser emitted from the port, and the connection identification portion is lit by the laser when the connecting piece 7, as shown in FIG. 4, is connected to the port. The connection identification portion is specifically formed by inscribing letters on the non-connection identification portion made of semi-transparent material. The specific letters inscribed on the connection identification portion of this embodiment are “ON”. The baffle 22 not only achieves dust-proof and shading effects, but also lights up the connection identification portion, i.e., the “ON” mark, when the optical fiber link is connected. This allows for determining whether the optical fiber link is connected or disconnected. When a laser beam shines on the baffle, the “ON” mark on the baffle lights up, indicating that the optical path is connected. It should be noted that checking whether the “ON” mark on the baffle is lit can only be done without inserting the connecting piece.

In this embodiment, the baffle 22 is designed to be a thin sheet with the same size as the output port of the sleeve plug 6, as shown in FIG. 5. The baffle 22 adheres to the port of the sleeve plug 6, sealing it off and preventing dust from entering the adapter and contacting the polished end face 71 of the connecting piece 7 on the back side, as shown in FIG. 3. At the same time, it blocks the light transmitted by the connecting piece 7. The guide rails 11 in this embodiment are guide grooves, as shown in FIG. 5. The openings of the guide grooves do not extend to the bottom of the adapter, but instead extend to just below the lower edge of the sleeve plug 6. When the baffle 22 slides down to this point, it adheres to and seals off the sleeve plug 6. The hook piece 21 is located in the middle of the front chamber of the frame. When the connecting piece 7 is inserted into place, the unlocking hook 72 needs to pop up and latch onto the frame 1 to prevent the connecting piece 7 from falling off. This design avoids the space needed for the unlocking hook 72 to pop up when the connecting piece 7 is inserted.

The dust-proof and shading optical fiber adapter in this embodiment has the following beneficial effects:

The frame 1 is injection molded from plastic material into a single piece, including a first connection end (i.e., a chamber), a second connection end (i.e., a chamber), and a middle section (i.e., a sleeve plug 6) connecting the first connection end and the second connection end. The first connection end is provided with an optical fiber connector insertion port, and the second connection end is also provided with an optical fiber connector insertion port. The adapter also includes a detachably installed upper cover 3 on the opening of the chamber. The upper cover 3 and the chamber together form a closed cavity. Each shading component 2 further includes an elastic spring 4, with both ends of the elastic spring 4 respectively contacting the upper surface of the hook piece 21 and the lower surface of the upper cover 3. The lower surface of the hook piece 21 engages with the connecting piece 7 inserted into the port to drive the hook piece 21 to swing upward. The lower surface of the hook piece 21 is provided with a raised portion, which is engaged with a resilient latching member on the connecting piece 7. Each side wall of the chambers of the frame 1 is provided with arcuate guide grooves (i.e., the guide rails 11). The two guide grooves align, and each baffle 22 is provided with guide blocks that slide along the guide grooves on both sides of the baffle 22. The lower end of the hook piece 21 is provided with a driving arm, and the baffle 22 is provided with a cooperating slot into which the end of the driving arm is inserted. The driving arm can be in contact with the upper or lower surface of the cooperating slot. The baffle 22 is made of semi-transparent material, with characters “ON” (a connection identification portion) inscribed on the front surface. When the optical fiber link is connected, the “ON” mark can be lit by the light from the optical fiber link, allowing for determining whether the optical fiber link is connected or disconnected. This dust-proof and shading adapter has a simple structure, small size, and good dust-proof and shading effects.

Comparison Example

Figure 7:
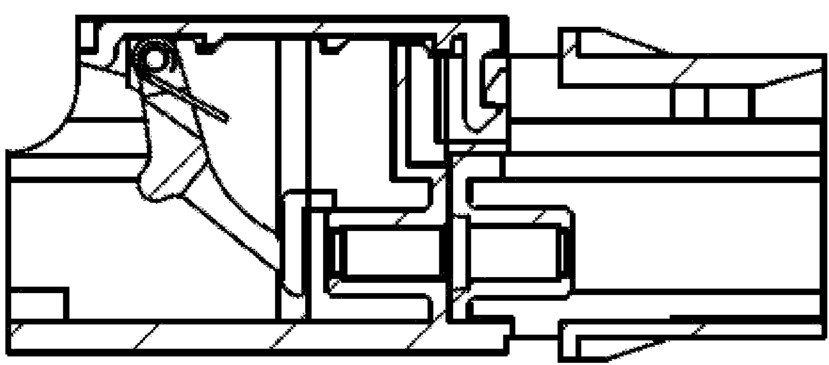
FIG. 7 is a cross-sectional view of a traditional dust-proof and shading adapter.
Figure 8:
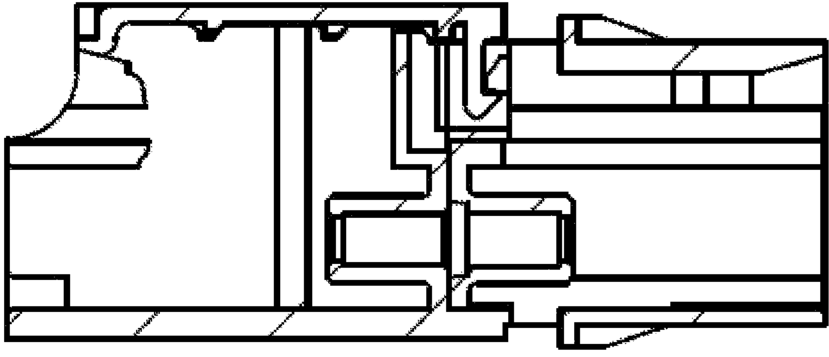
FIG. 8 is a cross-sectional view of the traditional dust-proof and shading adapter with the shading component removed.
Figure 9:
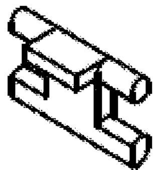
FIG. 9 is an isometric view of the baffle in the traditional dust-proof and shading adapter.

In the traditional dust-proof and shading adapter, the hook piece is set at the front end of the front chamber of the frame, as shown in FIG. 7. To avoid the space required for unlocking the latch when the connecting piece is inserted, the height of the adapter needs to be increased. In this comparison example, the guide grooves are vertical guide grooves, as shown in FIG. 7 and FIG. 8. When the connecting piece is inserted and the baffle rises vertically, it will interfere with the upper cover, requiring an increase in the height of the adapter. In this comparison example, a raised stop block is provided at the upper end of the baffle, as shown in FIG. 7 and FIG. 9. When the baffle slides down and contacts the upper edge of the sleeve plug, the baffle stops, so the size of the baffle is larger than that of the sleeve plug port. When the baffle rises vertically, it needs to increase the height of the adapter to prevent interference with the upper cover.

The above description is a further detailed explanation of this application in combination with specific preferred embodiments. It cannot be asserted that the specific embodiments of this application are limited to these explanations. For those skilled in the technical field related to this application, without departing from the concept of this application, numerous equivalent alternatives or significant modifications can be made, and they have the same performance or purpose and should be considered as falling within the scope of protection of this application.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A dust-proof and shading adapter, comprising a frame and shading components, an interior of a front end of the frame is formed with horizontally arranged chambers having upward openings, a front end of each of horizontally arranged chambers is provided with a port for mating engagement with a connecting piece, each of horizontally arranged chambers is equipped with one of the shading components that comprises a hook piece and a baffle, wherein, side walls of the chamber are provided with guide rails that restrict a vertical sliding movement of the baffle, wherein, the guide rails are arcuate and are curved outward towards the opening of the chamber, the bottom of each of the guide rails aligns with the bottom of the port, an upper end of the hook piece is hinged to the middle of an upper surface of the chamber, while a lower end of the hook piece is interlocked with the baffle through a hinged engagement, wherein a reciprocating rotational movement of the hook piece drives the baffle to slide up and down, enabling the baffle to cover or uncover the port.

2. The dust-proof and shading adapter according to claim 1, further comprising a detachably mounted upper cover on the opening of each of horizontally arranged chambers wherein the upper cover cooperates with the frame to form a sealed cavity.

3. The dust-proof and shading adapter according to claim 2, wherein each of the shading components further comprises an elastic spring piece, wherein two ends of the elastic spring piece are supported against the upper surface of the hook piece and a lower surface of the detachably mounted upper cover, respectively.

4. The dust-proof and shading adapter according to claim 3, wherein a lower surface of the hook piece engages with the connecting piece inserted into the port to drive the hook piece to swing upward, and the lower surface of the hook piece is provided with a protruding arched portion.

5. The dust-proof and shading adapter according to claim 2, wherein the detachably mounted upper cover is provided with an upper cover fixing element, and an upper end of the frame is preset with a fixing portion that cooperates with the upper cover fixing element to fix the detachably mounted upper cover.

6. The dust-proof and shading adapter according to claim 1, wherein the upper end of each of the hook pieces shares a common horizontally extending hinge axis hinged at the top of the chamber.

7. The dust-proof and shading adapter according to claim 1, wherein the baffle is made of semi-transparent material and comprises a connection identification portion and a non-connection identification portion, wherein the non-connection identification portion is used to block a laser emitted from the port, while the connection identification portion is lit by the laser when the connecting piece is connected to the port.

8. The dust-proof and shading adapter according to claim 1, wherein the guide rails are vertically arcuate extending guide grooves are formed by the guide rails on both side walls of the chamber, the guide grooves are aligned, and both sides of the baffle are formed with guide blocks that slide cooperatively along the guide grooves, respectively.

9. The dust-proof and shading adapter according to claim 1, wherein the lower end of the hook piece is formed with a drive arm, the baffle is formed with a cooperating groove, wherein an end of the drive arm is embedded in the cooperating groove, the drive arm engages with an upper or a lower surface of the cooperating groove, and a reciprocating rotational movement of the hook piece drives the baffle to slide up and down, enabling the baffle to cover or uncover the port.

* * * * *